(12) United States Patent
Ogura

(10) Patent No.: US 7,209,728 B2
(45) Date of Patent: Apr. 24, 2007

(54) MOBILE COMMUNICATION TERMINAL APPARATUS WHICH PERFORMS INTERMITTENT RECEPTION

(75) Inventor: Koji Ogura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 10/767,174

(22) Filed: Jan. 30, 2004

(65) Prior Publication Data
US 2004/0185820 A1    Sep. 23, 2004

(51) Int. Cl.
*H04B 1/16* (2006.01)
*H04B 17/00* (2006.01)

(52) U.S. Cl. .............................. 455/343.1; 455/67.11; 455/115.1; 455/226.1

(58) Field of Classification Search ................ 455/403, 455/435.1, 435.3, 442, 446, 513, 63.1, 67.11, 455/67.13, 550.1, 561, 91.95, 116.2, 115.1, 455/115.3
See application file for complete search history.

(56) References Cited

U.S. PATENT DOCUMENTS 6,240,126 B1 * 5/2001 Ohashi et al. ............... 375/132
6,421,540 B1 * 7/2002 Gilhousen et al. .......... 455/458
7,003,315 B2 * 2/2006 Kiyomoto et al. ........ 455/552.1
2002/0132585 A1 * 9/2002 Palermo et al. ............... 455/41

FOREIGN PATENT DOCUMENTS

| JP | 2001-196969 | 7/2001 |
|---|---|---|
| JP | 2001-285911 | 10/2001 |

OTHER PUBLICATIONS

Notification of Reasons for Rejection from Japanese Patent Office mailed on May 31, 2005, in Japanese Patent Application No. 2003-028507.

* cited by examiner

*Primary Examiner*—Tony T. Nguyen
(74) *Attorney, Agent, or Firm*—Finnegan, Henderson, Farabow, Garrett & Dunner, L.L.P.

(57) ABSTRACT

The reception quality of the radio signal is detected in a wakeup period. The detected reception quality is compared with the first threshold. If the detected reception quality is equal to or higher than the first threshold, the duration of a wakeup period as a next reception target is set to the first time. If the detected reception quality is less than the first threshold, the duration of the wakeup period as the next reception target is set to the second time longer than the first time.

12 Claims, 4 Drawing Sheets

MOBILE COMMUNICATION TERMINAL APPARATUS WHICH PERFORMS INTERMITTENT RECEPTION

CROSS-REFERENCE TO RELATED APPLICATIONS

This application is based upon and claims the benefit of priority from the prior Japanese Patent Application No. 2003-028507, filed Feb. 5, 2003, the entire contents of which are incorporated herein by reference.

BACKGROUND OF THE INVENTION

1. Field of the Invention

The present invention relates to a mobile communication terminal apparatus used in a cellular radio communication system.

2. Description of the Related Art

Recently, cellular radio communication systems have become popularized. In a cellular radio communication system, a plurality of base stations are distributed in a service area, and radio zones called cells are formed by these base stations. In each of these cells, radio connection is established between the base station and each mobile communication terminal apparatus. In this type of system, when a mobile communication terminal apparatus is powered on, synchronization is established between the mobile communication terminal apparatus and the nearest base station. After the establishment of synchronization, the apparatus transitions to a standby state.

In a standby state, the mobile communication terminal apparatus performs intermittent reception operation. In the intermittent reception operation, a wakeup period and sleep period are alternately set in a predetermined standby cycle so as to reduce the power consumption of the mobile communication terminal apparatus. The standby cycle is defined by the system.

In a wakeup period, the mobile communication terminal apparatus sequentially performs operation for wakeup, reception timing identification operation, and paging reception operation. According to W-CDMA (Wideband Code Division Multiple Access) (IMT-2000: 3GPP standards), for example, operation for wakeup, reception timing identification operation, and reception operation for a paging indicator channel (PICH) are sequentially performed.

Of these operations, in reception timing identification operation, first of all, the time average of the reception levels of radio signals arrived from a base station during synchronization establishment (to be referred to as an active base station hereinafter) is detected in a preset reception level measurement interval. The time average of reception levels is detected to suppress the influences of interference and noise. A path as a reception target is then selected on the basis of the detected time average of reception levels, and reception timing identification is performed for the selected path. In PICH reception operation, PICH reception is performed in accordance with the identified reception timing. When an incoming message addressed to the home terminal is detected, reception operation for termination control is performed in succession. If no incoming message addressed to the home terminal is detected, the apparatus performs operation for transition to a sleep period.

Mobile communication terminal apparatuses have recently been required to have longer continuous standby times. For this reason, various schemes of further reducing power consumption in intermittent reception operation have been proposed.

In the first scheme, for example, only when the reception level of a radio signal from an active base station is less than a threshold, a base station for which synchronization should be established is switched from the active base station to a neighboring base station. This switching processing is generally called reselection.

After the above PICH reception, the mobile communication terminal apparatus compares the detected value of the reception level of a radio signal from the active base station with a threshold. If the detected value is equal to or more than the threshold, the apparatus directly transitions to a sleep period. In contrast to this, if the detected value is less than the threshold, the apparatus searches for a neighboring base station without transitioning to a sleep period. The apparatus then compares the detected value of the reception level of a radio signal from the neighboring base station detected by this search with the detected value of the reception level of the radio signal from the above active base station. If a neighboring base station is found, which is higher in the detected value of reception level than the active base station by a predetermined level or more, reselection is executed. If no neighboring base station is found, which satisfies the above condition, the apparatus transitions to a sleep period.

According to the second scheme, a radio telephone apparatus is designed to measure the reception levels of radio waves from a base station in communication and other base stations for zone transition determination. In this scheme, the apparatus obtains the differences between the reception level of a radio wave from a base station in communication and the reception level of a radio wave from each of other base stations. As this difference increases, the frequency of measurement of the reception levels of radio waves from neighboring base stations is decreased. As the difference decreases, the frequency of measurement of the reception levels of radio waves from neighboring base stations is increased. This scheme is disclosed in, for example, Jpn. Pat. Appln. KOKAI Publication No. 2001-285911.

The use of these schemes will omit the operation of measuring the reception levels of radio signals from neighboring base-stations or reduce the frequency of measurement while the reception levels of radio signals from an active base station are high. This makes it possible to reduce the power consumption of the terminal apparatus in a standby state as compared with a case wherein the reception levels of radio signals from neighboring base stations are always measured regardless of the reception levels of radio signals from an active base station.

In each of the first and second schemes, however, the reception level measurement interval is always fixed in both cases wherein the reception levels of radio signals from an active base station are to be measured and the reception levels of radio signals from neighboring base stations are to be measured. For this reason, every time a reception level is measured, a predetermined amount of power is consumed.

In order to reduce the power consumption due to this reception level measurement, the reception level measurement interval may be shortened. If, however, the reception level measurement time is simply shortened, the interference and noise suppression effects become insufficient. In addition, a trouble occurs in reception timing identification, and the PICH reception performance deteriorates. Furthermore, the measurement precision on the reception levels of radio signals from an active base station and neighboring base stations deteriorates, and variations in measured values increase. For this reason, even reselection that need not be done as long as measurement is executed with high precision is done. As a consequence, the wakeup period increases, resulting in an increase in power consumption.

BRIEF SUMMARY OF THE INVENTION

It is an object of the present invention to provide a mobile communication terminal apparatus which can shorten a wakeup period in a standby state while maintaining high precision in determining the necessity of reselection, thereby further reducing the power consumption in a standby state, and a control module and control program for the apparatus.

In order to achieve the above object, according to an aspect of the present invention, in a mobile communication terminal apparatus which alternately sets a wakeup period and sleep period in a standby state and receives a radio signal transmitted from an active base station during synchronization establishment in a wakeup period, the reception quality of the radio signal is detected in the wakeup period, and the detected reception quality is compared with a first threshold. If the detected reception quality is equal to or higher than the first threshold, the duration of a wakeup period as a next reception target is set to a first time. If the detected reception quality is less than the first threshold, the duration of the wakeup period as the next reception target is set to a second time longer than the first time.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

DETAILED DESCRIPTION OF THE INVENTION

Figure 1:
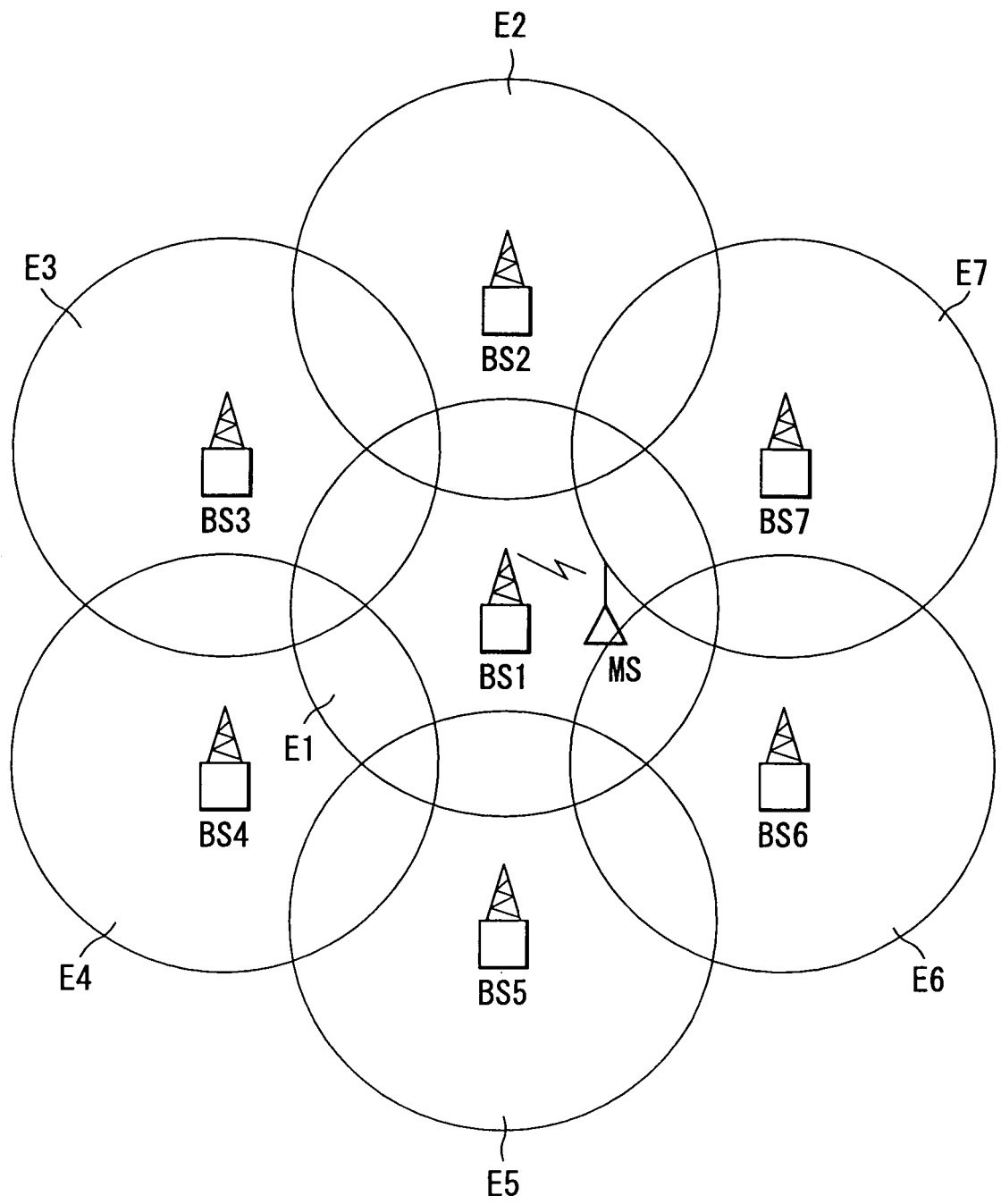
FIG. 1 is a view showing the schematic arrangement of a mobile communication system according to an embodiment of the present invention.

FIG. 1 is a view schematically showing the arrangement of a mobile communication system according to the present invention.

A plurality of base stations BS1 to BS7 are distributed and installed in a service area. These base stations BS1 to BS7 respectively form radio zones E1 to E7 called cells. A mobile communication terminal apparatus MS is set in a standby state after synchronization is established with one of the base stations BS1 to BS7 in one of the radio zones E1 to E7. Note that as a radio access scheme to be used between the base stations BS1 to BS7 and the mobile communication terminal apparatus MS, for example, the W-CDMA (Wideband Code Division Multiple Access) scheme is used.

Figure 2:
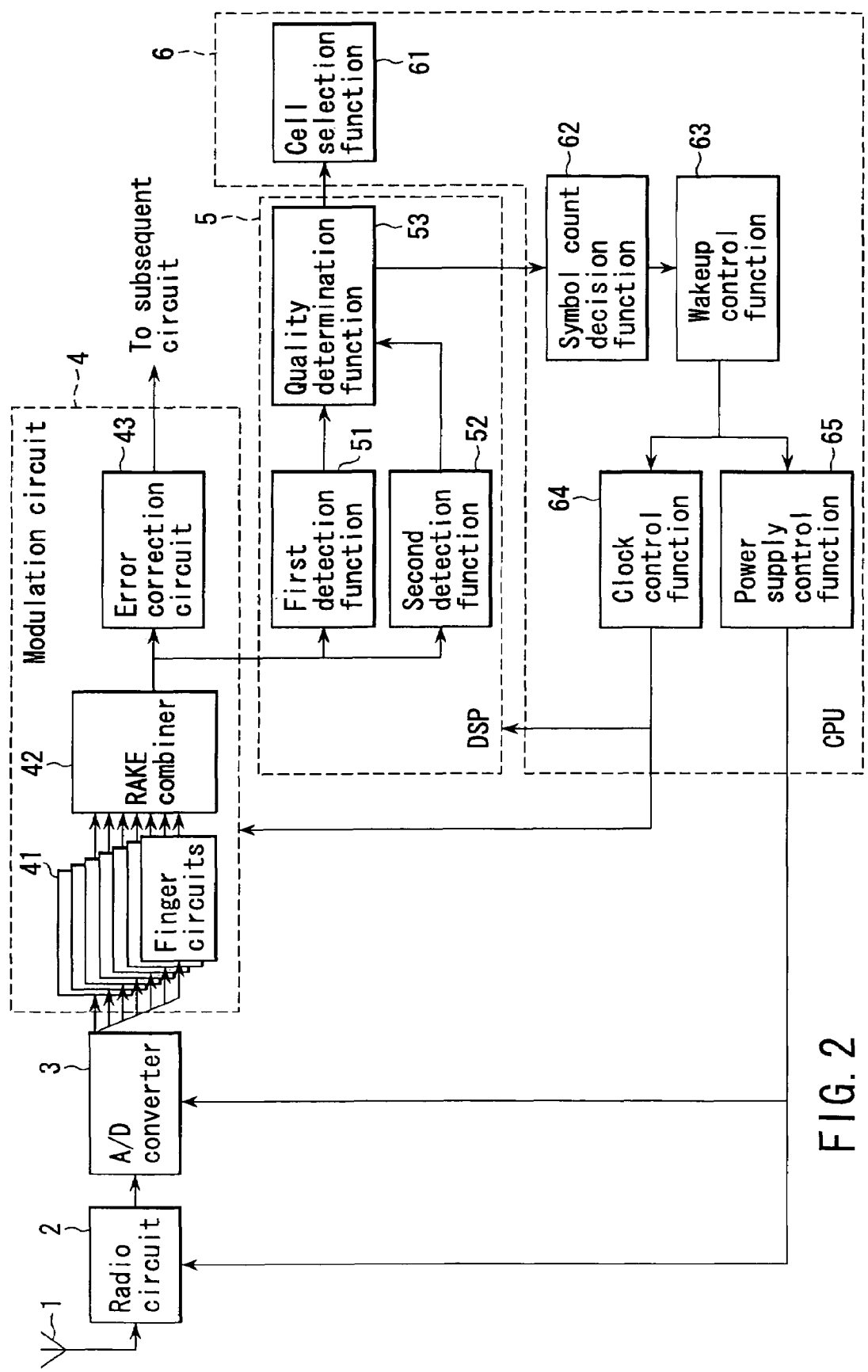
FIG. 2 is a block diagram showing the arrangement of the main part of a mobile communication terminal apparatus according to an embodiment of the present invention.

FIG. 2 is a block diagram showing the circuit arrangement of a portion of the above mobile communication terminal apparatus MS which is associated with the present invention.

Referring to FIG. 2, the radio signals transmitted from the base stations BS1 to BS7 are received by an antenna 1 and input to a radio circuit 2. In the radio circuit 2, the received radio signals are amplified by a low noise amplifier and converted into a received baseband signal by a frequency converter and quadrature demodulater. This received baseband signal is converted into a digital signal by an analog/digital (A/D) converter 3 and input to a modulation circuit 4.

The modulation circuit 4 includes a plurality of finger circuits 41, a RAKE combiner 42, and an error correction circuit 43. The received baseband signal contains a plurality of paths received through different transmission paths. The finger circuits 41 despread these paths by using spreading codes. The RAKE combiner 42 combines symbols of the demodulated signals of the respective paths output from the respective finger circuits 41 upon phase matching. The error correction circuit 43 performs error correction decoding of the demodulated signal output from the RAKE combiner 42. This demodulated signal having undergone error correction decoding is supplied to a subsequent circuit (not shown) including a speech decoder, a video decoder, and the like.

Note that the radio circuit 2, A/D converter 3, and modulation circuit 4 constitute a reception demodulation unit.

The mobile communication terminal apparatus MS includes a DSP (Digital Signal Processor) 5 and CPU (Central Processing Unit) 6. The DSP 5 and CPU 6 constitute a control unit for the reception system.

The DSP 5 includes a first detection function 51, second detection function 52, and quality determination function 53. The first detection function 51 detects the reception quality of a radio signal sent from an active base station on the basis of the input digital demodulated signal. The second detection function 52 detects the reception qualities of radio signals sent from a plurality of neighboring base stations on the basis of the input digital demodulated signal. Note that the reception quality is expressed by the ratio (Ec/No) of signal to noise.

The quality determination function 53 compares the reception quality Ec/No(Act) detected by the first detection function 51 with preset first and second thresholds Q1 and Q2 (Q1>Q2) and determines the relationship of magnitude therebetween. If the above reception quality Ec/No(Act) <Q2, the quality determination function 53 calculates the difference between the reception quality Ec/No(Act) detected by the first detection function 51 and a reception quality Ec/No(Mon) detected by the second detection function 52. The quality determination function 53 then compares this calculated reception quality difference (Ec/No(Act)−Ec/No(Mon)) with the threshold Q3 to determine the relationship of magnitude therebetween.

The central processing unit (CPU) 6 includes a cell selection function 61, symbol count decision function 62, wakeup control function 63, clock control function 64, and power supply control function 65. The cell selection function 61 acquires the quality determination result obtained by the quality determination function 53 from the DSP 5. The cell selection function 61 then selects a cell for reselection on the basis of this acquired quality determination result.

On the basis of the quality determination result obtained by the quality determination function 53 of the DSP 5, the symbol count decision function 62 determines the number of symbols to be received in reception quality measurement in the next wakeup period.

The wakeup control function 63 determines a start timing of each wakeup period. The wakeup control function 63 also determines the duration of a reception quality measurement interval in the next wakeup period in consideration of the reception target symbol count set by the symbol count decision function 62.

The clock control function 64 controls the timing of supply of clocks to the modulation circuit 4 and DSP 5 in accordance with the timing information determined by the wakeup control function 63. With this timing control, the modulation circuit 4 and DSP 5 operate only in the determined reception quality measurement interval and a PICH reception interval.

The power supply control function 65 controls the power supply timing for the radio circuit 2 and A/D converter 3 in accordance with the timing information determined by the wakeup control function 63. With this timing control, the radio circuit 2 and A/D converter 3 operate only in the determined wakeup period.

The operation of the mobile communication terminal apparatus MS having the above arrangement will be described next.

Figure 3:
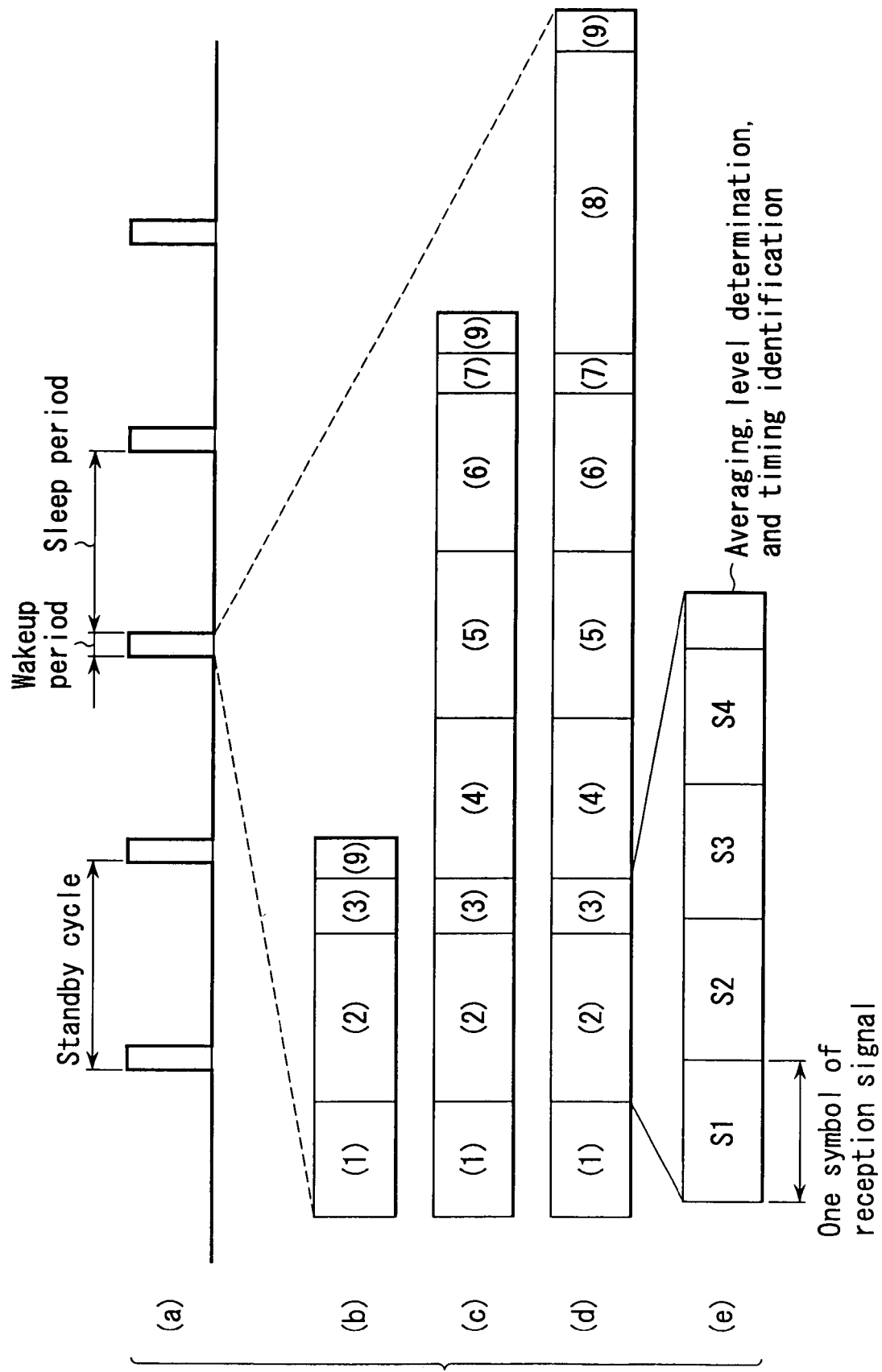
FIG. 3 is timing chart for explaining the intermittent reception operation of the mobile communication terminal apparatus in FIG. 2.

Intermittent reception operation will be briefly described first. FIG. 3 is timing chart for explaining this intermittent reception operation.

The mobile communication terminal apparatus MS alternately repeats a wakeup period and sleep period in accordance with a standby cycle (e.g., 1 to 3 sec) called DRX-_Cycle defined in the system by using the wakeup control function 63, as shown in (a) of FIG. 3.

As shown in (b) of FIG. 3, in a wakeup period, the mobile communication terminal apparatus MS performs wakeup processing (1) first. In this wakeup processing (1), the circuit sections necessary for reception operation in the apparatus are activated. More specifically, the following operations are sequentially performed: waking up the CPU 6 and DSP 5, starting various clock generating circuits by the clock control function 64, starting power supply to the radio circuit 2 and A/D converter 3 by the power supply control function 65, and initialization in the modulation circuit 4.

When this wakeup operation is complete, the mobile communication terminal apparatus MS performs reception timing identification processing (2). In this reception timing identification processing (2), first of all, the reception quality of a radio signal sent from an active base station is measured by using the first detection function 51. This reception quality is measured by detecting the reception levels of a plurality of symbols of demodulated signals output from the RAKE combiner 42 and obtaining the average of the detected reception levels. The average of the reception levels becomes the reception quality Ec/No(Act) of a radio signal sent from the active base station. When this reception quality Ec/No(Act) is detected, a reception target path is selected on the basis of the detected reception quality Ec/No(Act), and reception timing identification is performed for the selected path.

The mobile communication terminal apparatus MS then performs PICH reception processing (3). In this PICH reception processing (3), the modulation circuit 4 is operated at the reception timing identified by the above reception timing identification processing (2), and the modulation circuit 4 then demodulates a PICH signal. The CPU 6 checks whether an incoming message addressed to the home terminal is inserted in this demodulated PICH signal.

If an incoming message addressed to the home terminal is detected upon this determination, reception operation for termination control is continuously performed. If no incoming message addressed to the home terminal is contained in the signal, transition processing (9) for a sleep period is performed. In this transition processing (9), the following operations are sequentially performed: stopping power supply to the radio circuit 2 and A/D converter 3 using the power supply control function 65, storing settings such as the next intermittent wakeup timing, stopping generating various clocks using the clock control function 64, and stopping the CPU 6 and DSP 5. Thereafter, the mobile communication terminal apparatus MS transitions to reception halt operation with a low power consumption.

Before the transition processing (9) for the sleep period, the mobile communication terminal apparatus MS compares the detected reception quality Ec/No(Act) with a threshold. If the reception quality Ec/No(Act) is less than the threshold, the apparatus performs operation for the measurement of the reception qualities of radio signals transmitted from neighboring base stations, as shown in (c) of FIG. 3. In the case shown in (c) of FIG. 3, the reception qualities of radio signals from three different neighboring base stations are measured in intervals (4), (5), and (6), respectively. In each of these measurement intervals (4), (5), and (6), reception quality measurement operation is performed by detecting the reception levels of a plurality of symbols first and then obtaining the average of the detected reception levels, as in the above reception timing identification processing (2) for a radio signal from the active base station. Each average of reception levels becomes the reception quality Ec/No(Mon) of a radio signal sent from a corresponding one of the neighboring base stations.

In an operation interval (7), the mobile communication terminal apparatus MS compares the detected reception quality Ec/No(Act) of a radio signal from the active base station with each reception quality Ec/No(Mon) of a radio signal from a corresponding one of the neighboring base stations. If no good neighboring base station can be found, which exhibits a reception quality average larger than that of the active base station by a predetermined amount, transition processing (9) for a sleep period is performed to transition to the sleep period.

If a good neighboring base station is found, which exhibits a reception quality average larger than that of the active base station by the predetermined amount, reselection processing (8) is executed, as shown in (d) of FIG. 3. In the reselection processing (8), the reception quality of a radio signal transmitted from the found neighboring base station is measured, and a reception target path is selected on the basis of the measured reception quality. This processing is then performed by performing reception timing identification for the selected path. Upon completion of the reselection processing, the mobile communication terminal apparatus MS transitions to the sleep period after executing the transition processing (9) for the sleep period.

Figure 4:
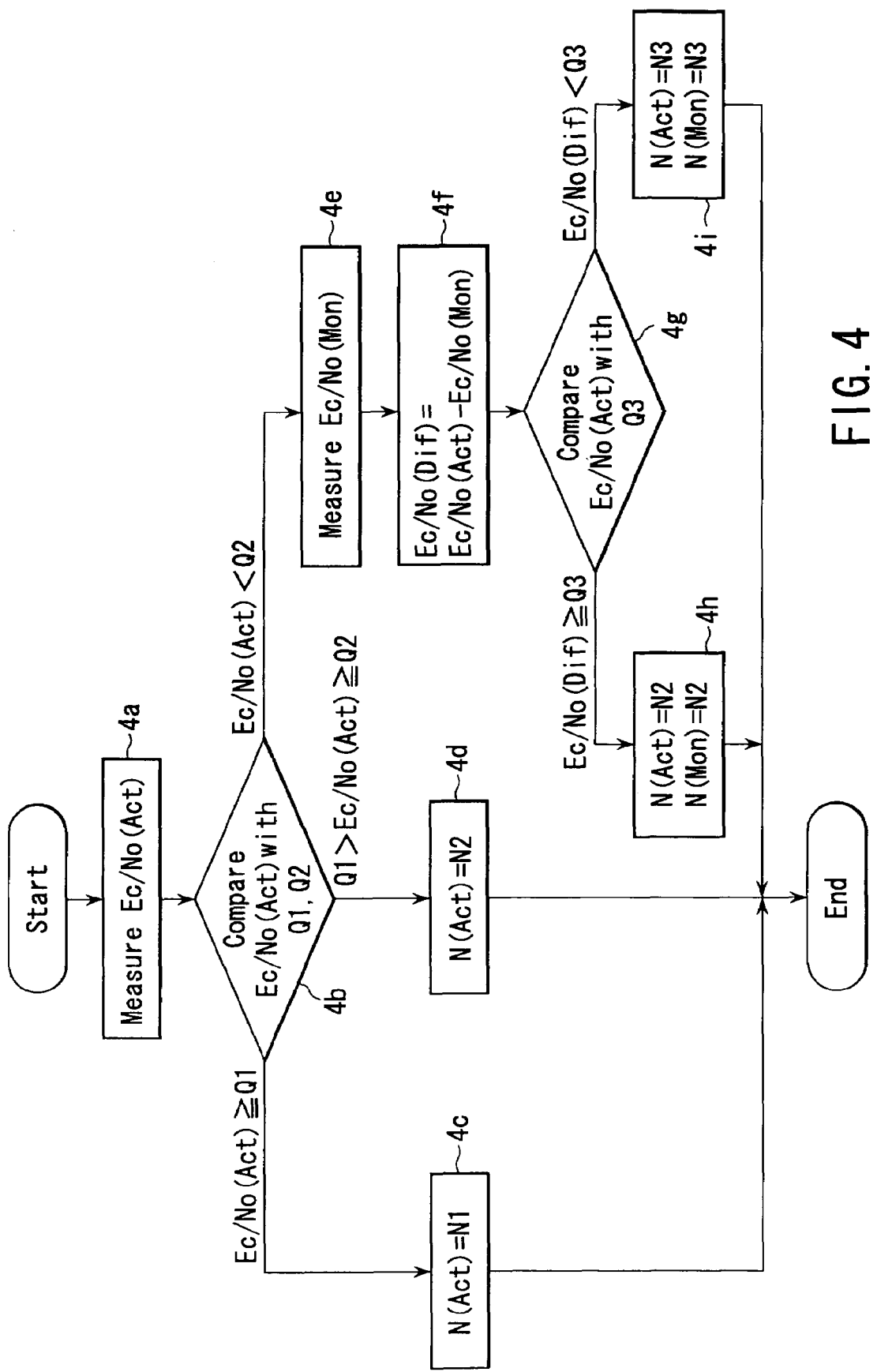
FIG. 4 is a flow chart showing a control procedure for the duration of a reception quality measurement interval by the mobile communication system in FIG. 2 and control contents.

In the above intermittent reception operation, the mobile communication terminal apparatus MS executes wakeup period variable setting control as follows. FIG. 4 is a flow chart showing a control procedure and control contents.

When the mobile communication terminal apparatus MS detects the reception quality Ec/No(Act) of a radio signal sent from an active base station in step 4a, the flow advances to step 4b. The above detected reception quality Ec/No(Act) is then compared with the preset thresholds Q1 and Q2 (Q1>Q2) by using the quality determination function 53. Note that the reception quality Ec/No(Act) is measured in an operation interval (2) in (b) of FIG. 3 by the first detection function 51 of the DSP 5.

When the comparison result from the quality determination function 53 is obtained, the mobile communication terminal apparatus MS performs processing for determining the number of symbols to be received in reception quality measurement operation in the next wakeup period by using the symbol count decision function 62.

If, for example, Ec/No(Act)≧Q1, it is determined that the reception quality of a radio signal from the active base station is sufficiently good. The flow then shifts to step 4c, in which a symbol count (reception target symbol count) N(Act) to be received in reception quality measurement operation (2) in the next wakeup period is set to N1 (=2 symbols).

In the reception quality measurement operation (2) in the next wakeup period, only two symbols of a radio signal sent from the active base station are received. The reception quality Ec/No(Act) is then obtained by averaging the reception levels of two received symbols. That is, while the reception quality of a radio signal from the active base station is sufficiently good, the reception quality measurement operation (2) concerning the active base station is performed in a very short period of time corresponding to two symbols, thereby reducing the power consumption of the apparatus.

In contrast to this, if Q1>Ec/No(Act)≧Q2, it is determined that the reception quality of a radio signal from the active base station has slightly deteriorated but has not decreased to a quality which requires reselection. The flow advances to step 4d. In this step, the symbol count N(Act) to be received in the reception quality measurement operation (2) in the next wakeup period is set to N2 (=4 symbols).

In the reception quality measurement operation (2) in the next wakeup period, four symbols of a radio signal sent from the active base station are received. The reception quality Ec/No(Act) is obtained by averaging the reception levels of the four received symbols. While the reception quality of a radio signal from the active base station has slightly deteriorated but has not decreased to a quality which requires reselection, the reception quality measurement operation (2) for the active base station is performed in a time corresponding to the four symbols. This makes it possible to suppress the power consumption of the apparatus low while maintaining a necessary, sufficient measurement precision.

Assume that the comparison determination result obtained by the quality determination function 53 indicates Ec/No(Act)<Q2. In this case, the mobile communication terminal apparatus MS shifts to step 4e to detect the reception quality Ec/No(Mon) of a radio signal sent from each neighboring base station in a corresponding one of the intervals (4), (5), and (6). The mobile communication terminal apparatus MS then shifts to step 4f to calculate the difference between the reception quality Ec/No(Act) detected by the first detection function 51 and the reception quality Ec/No(Mon) detected by the second detection function 52. In step 4g, the mobile communication terminal apparatus MS compares the calculated reception quality difference (Ec/No(Act)−Ec/No(Mon)) with the threshold Q3 and determines the relationship of magnitude therebetween.

The mobile communication terminal apparatus MS then determines the number of symbols to be received in reception quality measurement operation in the next wakeup period by using the symbol count decision function 62 on the basis of the comparison determination result on the reception quality difference (Ec/No(Act)−Ec/No(Mon)) and the threshold Q3. This determination of a reception target symbol count is performed for the reception quality measurement operation (2) associated with the active base station and the respective reception quality measurement operations (4), (5), and (6) associated with the neighboring base stations.

If, for example, (Ec/No(Act)−Ec/No(Mon))≧Q3, it is determined that although the reception quality of a radio signal from the active base station has deteriorated, there is no proper neighboring base station as a reselection target. The flow then shifts to step 4h. In this step, the reception target symbol count N(Act) for the reception quality measurement operation (2) associated with the active base station and the reception target symbol counts N(Mon) for the reception quality measurement operations (4), (5), and (6) associated with the neighboring base stations in the next wakeup period are set to N2 (=4 symbols).

In the reception quality measurement operation (2) in the next wakeup period, therefore, four symbols of a radio signal sent from the active base station are received. The reception quality Ec/No(Act) is obtained by averaging the reception levels of the four received symbols. Likewise, four symbols of a radio signal sent from each neighboring base station are received in a corresponding one of the operations (4), (5), and (6) for measuring the reception quality of a radio signal from each neighboring base station. Each reception quality Ec/No(Mon) is obtained by averaging the reception levels of the four received symbols.

That is, while the reception quality of a radio signal from the active base station has deteriorated but there is no proper neighboring base station as a reselection target, the reception quality measurement operation (2) associated with the active base station and the reception quality measurement operations (4), (5), and (6) associated with the neighboring base stations are performed for a period of time corresponding to four symbols. This makes it possible to decrease a wakeup period to a short duration and hence to suppress the power consumption of the apparatus low.

In contrast to this, if (Ec/No(Act)−Ec/No(Mon))<Q3, it is determined that reselection is required, and there is a proper neighboring base station as a reselection target. The flow shifts to step 4i. In this step, the reception target symbol count N(Act) for the reception quality measurement operation (2) associated with the active base station and the reception target symbol counts N(Mon) for the reception quality measurement operations (4), (5), and (6) associated with the neighboring base stations in the next wakeup period are set to N3 (=8 symbols).

In the reception quality measurement operation (2) in the next wakeup period, therefore, eight symbols of a radio signal sent from the active base station are received. The reception quality Ec/No(Act) is obtained by averaging the reception levels of the eight received symbols. Likewise, eight symbols of a radio signal sent from each neighboring base station are received in a corresponding one of the operations (4), (5), and (6) for measuring the reception quality of a radio signal from each neighboring base station.

Each reception quality Ec/No(Mon) is obtained by averaging the reception levels of the eight received symbols.

That is, while reselection is required, and there is a proper neighboring base station as a reselection target, the average of the reception levels of eight symbols is obtained in the reception quality measurement operation (2) associated with the active base station and the reception quality measurement operations (4), (5), and (6) associated with the neighboring base stations, thereby obtaining accurate reception quality measurement values with the influences of interference and noise being sufficiently suppressed. This makes it possible to reduce variations in reception quality measurement value among the active base station and neighboring base stations and hence perform reselection processing with more accuracy.

As described above, according to this embodiment, the reception quality of a radio signal sent from an active base station is determined by the DSP 5 on the basis of the thresholds Q1 and Q2 in each wakeup period. The reception quality measurement interval for the active base station in the next wakeup period is variously set by the CPU 6 in accordance with the determination result. In addition, the DSP 5 determines the difference between the reception quality of a radio signal sent from the active base station and the reception quality of a radio signal sent from each neighboring base station on the basis of the threshold Q3. The reception quality measurement interval for the active base station and each neighboring base station in the next wakeup period is variously set by the CPU 6 in accordance with this determination result.

While the reception quality of a radio signal from the active base station is sufficiently good, therefore, the reception quality measurement interval for the active base station is as short as a time corresponding to two symbols. This makes it possible to reduce the power consumption of the apparatus.

In addition, while the reception quality of a radio signal from the active base station has slightly deteriorated but has not decreased to a quality that requires reselection, the reception quality measurement interval for the active base station is set to a necessary, sufficient time corresponding to four symbols. This makes it possible to suppress the power consumption of the apparatus low while maintaining a necessary, sufficient measurement precision.

Furthermore, while the reception quality of a radio signal from the active base station has deteriorated but there is no proper neighboring base station as a reselection target, the reception quality measurement interval for the active base station is suppressed to a relatively short time corresponding to four symbols. This makes it possible to decrease a wakeup period to a short duration and hence to suppress the power consumption of the apparatus low.

Moreover, while reselection is required, and there is a proper neighboring base station as a reselection target, the reception quality measurement interval for the active base station and the reception quality measurement interval for each neighboring base station are set to a sufficiently long period of time corresponding to eight symbols. Therefore, an accurate reception quality measurement value can be obtained by sufficiently suppressing the influences of interference and noise. This makes it possible to reduce variations in reception quality measurement value among the active base station and neighboring base stations and accurately perform reselection processing.

Note that the present invention is not limited to the above embodiment. For example, in the above embodiment, the duration of a wakeup period is variably set in a total of three steps in accordance with Ec/No(Act) and the difference between Ec/No(Act) and Ec/No(Mo). However, the duration of a wakeup period may be variously set in four or more steps, and may be linearly changed in accordance with preset variation characteristics.

In addition, according to this embodiment, in steps 4h and 4i, N(Act) and N(Mon) are set to the same value (=N3). However, N(Act) and N(Mon) may be set to different values.

Furthermore, the above embodiment has exemplified the mobile communication system using the W-CDMA scheme. However, the present invention can be applied to mobile communication systems using other radio access schemes. In addition, the type and circuit arrangement of the mobile communication terminal apparatus, the setting control procedure for a wakes up interval, the control contents, and the like can be variously modified and implemented within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal apparatus which alternately sets a wakeup period and a sleep period in a standby state and receives a radio signal transmitted from an active base station during synchronization establishment and a radio signal transmitted from a neighboring base station existing near the active base station in a wakeup period, comprising:

first detection means for detecting a reception quality of the radio signal from the active base station in the wakeup period;

second detection means for detecting a reception quality of the radio signal from the neighboring base station in the wakeup period;

third detection means for detecting a difference between the reception quality detected by the first detection means and the reception quality detected by the second detection means; and setting means for setting a duration of a wakeup period as a next reception target in accordance with the reception quality difference detected by the third detection means.

2. The apparatus according to claim 1, wherein the setting means:

comparison means for comparing the reception quality difference detected by the third detection means with a threshold;

first setting means for setting a duration of a wakeup period as a next reception target to a first time if it is determined on the basis of the comparison result obtained by the comparison means that the detected reception quality is not less than the threshold; and second setting means for setting the duration of the wakeup period as the next reception target to a second time longer than the first time if it is determined on the basis of the comparison result obtained by the comparison means that the detected reception quality is less than the threshold.

3. The apparatus according to claim 2, wherein when the first and second detection means are to receive a plurality of symbols of radio signals from the active base station and the neighboring base station and obtain averages of reception qualities, the first setting means sets a reception target symbol count of the radio signal from the active base station in the wakeup period as the next reception target to a first value if the detected reception quality difference is not less than the threshold, and the second setting means sets the reception target symbol count of the radio signal from the active base station in the wakeup period as the next reception target to a second value larger than the first value if the detected reception quality difference is less than the threshold.

4. The apparatus according to claim 2, wherein when the first and second detection means are to receive a plurality of symbols of radio signals from the active base station and the neighboring base station and obtain averages of reception qualities, the first setting means sets the reception target symbol count of the radio signal from the neighboring base station in the wakeup period as the next reception target to a third value if the detected reception quality difference is not less than the threshold, and the second setting means sets the reception target symbol count of the radio signal from the neighboring base station in the wakeup period as the next reception target to a fourth value larger than the third value if the detected reception quality difference is less than the threshold.

5. The apparatus according to claim 2, wherein when the first and second detection means are to receive a plurality of symbols of radio signals from the active base station and the neighboring base station and obtain averages of reception qualities, the first setting means sets, if the detected reception quality difference is not less than the threshold, the reception target symbol count of the radio signal from the neighboring base station in the wakeup period as the next reception target to a fifth value and sets the reception target symbol count of the radio signal from the active base station to a sixth value not less than the fifth value, and the second setting means respectively sets, if the detected reception quality difference is less than the threshold, reception target symbol counts of radio signals from the neighboring base station and the active base station in the wakeup period as the next reception target to seventh and eighth values larger than the fifth and sixth values.

6. A mobile communication terminal apparatus which alternately sets a wakeup period and a sleep period in a standby state in a single system and receives a radio signal transmitted from an active base station during synchronization establishment in a wakeup period, comprising:

detection means for detecting a reception quality of the radio signal in the wakeup period; and setting means for setting a duration of a wakeup period as a next reception target in accordance with the detected reception quality, wherein the setting means includes:

comparison means for comparing the reception quality detected by the detection means with a first threshold;

first setting means for setting a duration of a first wakeup period as the next reception target to a first time period if it is determined on the basis of the comparison result obtained by the comparison means that the detected reception quality is not less than the first threshold; and second setting means for setting the duration of a second wakeup period as the next reception target to a second time period longer than the first time period if it is determined on the basis of the comparison result obtained by the comparison means that the detected reception quality is less than the first threshold.

7. The apparatus according to claim 6, wherein when the detection means is to receive a plurality of symbols of the radio signal and obtain an average of reception qualities thereof, the first setting means sets a reception target symbol count of the radio signal in the wakeup period as the next reception target to a first value if the obtained average of the reception qualities is not less than the first threshold, and the second setting means sets the reception target symbol count of the radio signal in the wakeup period as the next reception target to a second value larger than the first value if the obtained average of the reception qualities is less than the first threshold.

8. A mobile communication terminal apparatus which alternately sets a wakeup period and a sleep period in a standby state and receives a radio signal transmitted from an active base station during synchronization establishment in a wakeup period, comprising:

first detection means for detecting a reception quality of the radio signal transmitted from the active base station in the wakeup period;

first comparison means for comparing the reception quality detected by the first detection means with a first threshold;

second comparison means for comparing the reception quality detected by the first detection means with a second threshold set to be lower than the first threshold;

first setting means for setting a duration of the wakeup period as the next reception target to a first time if it is determined on the basis of the comparison results obtained by the first and second comparison means that the detected reception quality is not less than the first threshold;

second setting means for setting the duration of the wakeup period as the next reception target to a second time longer than the first time if it is determined on the basis of the comparison results obtained by the first and second comparison means that the detected reception quality is less than the first threshold and not less than the second threshold;

second detection means for detecting a reception quality of a radio signal transmitted from a neighboring base station existing near the active base station if it is determined on the basis of the comparison result obtained by the second comparison means that the detected reception quality is less than the second threshold;

third detection means for detecting a difference between the reception quality detected by the first detection means and the reception quality detected by the second detection means;

third comparison means for comparing the reception quality detected by the third detection means with a third threshold;

third setting means for setting the duration of the wakeup period as the next reception target to a third time longer than the second time if it is determined on the basis of the comparison result obtained by the third comparison means that the detected reception quality difference is not less than the third threshold; and fourth setting means for setting the duration of the wakeup period as the next reception target to a fourth time longer than the third time if it is determined on the basis of the comparison result obtained by the third comparison means that the detected reception quality difference is less than the third threshold.

9. The apparatus according to claim 8, wherein when the first and second detection means are to receive a plurality of symbols of radio signals from the active base station and the neighboring base station and obtain averages of reception qualities, the first setting means sets a reception target symbol count of the radio signal from the active base station in the wakeup period as the next reception target to a first value if the obtained average of the reception qualities is not less than a first threshold, and the second setting means sets the reception target symbol count of the radio signal from the active base station in the wakeup period as the next reception target to a second value larger than the first value if the obtained average of the reception qualities is less than the threshold.

10. The apparatus according to claim 8, wherein when the first and second detection means are to receive a plurality of symbols of radio signals from the active base station and the neighboring base station and obtain averages of reception qualities, the third setting means sets the reception target symbol count of the radio signal from the active base station in the wakeup period as the next reception target to a third value if the detected reception quality difference is not less than the third threshold, and the fourth setting means sets the reception target symbol count of the radio signal from the active base station in the wakeup period as the next reception target to a fourth value larger than the third value if the detected reception quality difference is less than the third threshold.

11. The apparatus according to claim 8, wherein when the first and second detection means are to receive a plurality of symbols of radio signals from the active base station and the neighboring base station and obtain averages of reception qualities, the third setting means sets the reception target symbol count of the radio signal from the neighboring base station in the wakeup period as the next reception target to a fifth value if the detected reception quality difference is not less than the third threshold, and the fourth setting means sets the reception target symbol count of the radio signal from the neighboring base station in the wakeup period as the next reception target to a sixth value larger than the fifth value if the detected reception quality difference is less than the third threshold.

12. The apparatus according to claim 8, wherein when the first and second detection means are to receive a plurality of symbols of radio signals from the active base station and the neighboring base station and obtain averages of reception qualities, the third setting means sets, if the detected reception quality difference is not less than the threshold, the reception target symbol count of the radio signal from the neighboring base station in the wakeup period as the next reception target to a seventh value and sets the reception target symbol count of the radio signal from the active base station to an eighth value not less than the seventh value, and the fourth setting means respectively sets, if the detected reception quality difference is less than the threshold, reception target symbol counts of radio signals from the neighboring base station and the active base station in the wakeup period as the next reception target to ninth and 10th values larger than the seventh and eighth values.

\* \* \* \* \*

UNITED STATES PATENT AND TRADEMARK OFFICE
CERTIFICATE OF CORRECTION

PATENT NO.        : 7,209,728 B2                                                  Page 1 of 1
APPLICATION NO.   : 10/767174
DATED             : April 24, 2007
INVENTOR(S)       : Ogura It is certified that error appears in the above-identified patent and that said Letters Patent is hereby corrected as shown below:

Title page, after Item (65) and before Item (51), please add the following:

--(30) Foreign Application Priority Data

Feb. 5, 2003    (JP) . . . . . . . . . 2003-028507--.

Signed and Sealed this

Twenty-sixth Day of June, 2007

JON W. DUDAS
*Director of the United States Patent and Trademark Office*